US009723102B2

United States Patent
Occhino et al.

(10) Patent No.: US 9,723,102 B2
(45) Date of Patent: *Aug. 1, 2017

(54) GATHERING INFORMATION ABOUT CONNECTIONS IN A SOCIAL NETWORKING SERVICE

(71) Applicant: Facebook, Inc., Menlo Park, CA (US)

(72) Inventors: Thomas Occhino, Palo Alto, CA (US); Olumakinde Adegboyega Adeagbo, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/079,490

(22) Filed: Mar. 24, 2016

(65) Prior Publication Data
US 2016/0212236 A1  Jul. 21, 2016

Related U.S. Application Data

(63) Continuation of application No. 13/239,736, filed on Sep. 22, 2011, which is a continuation of application No. 12/496,606, filed on Jul. 1, 2009.

(51) Int. Cl.
*G06F 15/16* (2006.01)
*H04L 29/08* (2006.01)
(Continued)

(52) U.S. Cl.
CPC .......... *H04L 67/306* (2013.01); *G06Q 50/01* (2013.01); *H04L 51/32* (2013.01); *H04L 67/16* (2013.01); *H04L 67/22* (2013.01); *H04W 4/14* (2013.01)

(58) Field of Classification Search
CPC ......... H04L 67/16; H04L 67/22; H04L 51/32; H04L 67/306; H04W 4/14; G06Q 50/01
(Continued)

(56) References Cited

U.S. PATENT DOCUMENTS 6,327,586 B1   12/2001   Kisiel
7,596,597 B2   9/2009    Liu et al.
(Continued)

FOREIGN PATENT DOCUMENTS

CN   1434947   8/2003
CN   1988531   6/2007
(Continued)

OTHER PUBLICATIONS

Gross et al.; "Information revelation and privacy in online social networks"; WPES '05 Proceedings of the 2005 ACM workshop on Privacy in the electronic society; pp. 71-80.
(Continued)

*Primary Examiner* — Kenneth R Coulter
(74) *Attorney, Agent, or Firm* — Fenwick & West LLP (57) ABSTRACT

To enhance information about connections in a social networking service, embodiments of the invention enable users to reference nodes while posting content to a communication channel. To identify connections within content in the social networking service, users of the social networking service are provided an interface to post content items in communication channels of the social networking service. A trigger received in the interface indicates that a user wishes to identify a connection in the posted content item. Selectable links enable the user to mention another node in the social networking service when posting a content item. As users reference nodes in content items, information about the connections with the referenced nodes is gathered and stored in a database that is indexable and searchable in real-time.

17 Claims, 6 Drawing Sheets

(51) Int. Cl.
  *G06Q 50/00* (2012.01)
  *H04L 12/58* (2006.01)
  *H04W 4/14* (2009.01)
(58) Field of Classification Search
  USPC .......... 709/204–206, 224, 223; 715/751–759
  See application file for complete search history.

(56) References Cited

U.S. PATENT DOCUMENTS

| | | | |
|---|---|---|---|
| 7,853,622 | B1 | 12/2010 | Baluja et al. |
| 8,307,086 | B2 | 11/2012 | Whitnah et al. |
| 8,402,094 | B2 | 3/2013 | Bosworth et al. |
| 8,612,483 | B2 | 12/2013 | Fischer et al. |
| 9,332,077 | B2 * | 5/2016 | Occhino ................. H04L 67/16 |
| 2005/0235062 | A1 | 10/2005 | Lunt et al. |
| 2005/0267940 | A1 | 12/2005 | Galbreath et al. |
| 2006/0042483 | A1 | 3/2006 | Work et al. |
| 2006/0085253 | A1 | 4/2006 | Mengerink et al. |
| 2006/0149731 | A1 | 7/2006 | Schirmer et al. |
| 2006/0173957 | A1 | 8/2006 | Robinson et al. |
| 2007/0005750 | A1 | 1/2007 | Lunt et al. |
| 2007/0043766 | A1 | 2/2007 | Nicholas et al. |
| 2007/0174389 | A1 | 7/2007 | Armstrong et al. |
| 2007/0266097 | A1 | 11/2007 | Harik et al. |
| 2008/0040474 | A1 | 2/2008 | Zuckerberg et al. |
| 2008/0040475 | A1 | 2/2008 | Bosworth et al. |
| 2008/0040673 | A1 | 2/2008 | Zuckerberg et al. |
| 2008/0132215 | A1 | 6/2008 | Soderstrom et al. |
| 2008/0189169 | A1 | 8/2008 | Turpin et al. |
| 2008/0288582 | A1 | 11/2008 | Pousti et al. |
| 2009/0070219 | A1 | 3/2009 | D'Angelo et al. |
| 2009/0077062 | A1 | 3/2009 | Spivack et al. |
| 2010/0164957 | A1 | 7/2010 | Lindsay et al. |
| 2010/0169426 | A1 | 7/2010 | Dreyfus et al. |
| 2010/0332330 | A1 | 12/2010 | Goel et al. |
| 2011/0004692 | A1 | 1/2011 | Occhino et al. |
| 2014/0258422 | A1 | 9/2014 | Fischer et al. |

FOREIGN PATENT DOCUMENTS

| | | |
|---|---|---|
| CN | 101090370 | 12/2007 |
| CN | 101299673 | 11/2008 |
| JP | 2003-233564 | 8/2003 |
| JP | 2006-331297 | 12/2006 |
| JP | 2007-249310 | 9/2007 |

OTHER PUBLICATIONS

Freeman, L., "Visualizing Social Networks," Journal of Social Structure, 2000, vol. 1, No. 1, fifteen pages.
O'Reilly, T. et al., "The Twitter Book," May 13, 2009, O'Reilly Media, Inc., Introduction and Chaper 1, forty-six pages.
PCT International Search Report and Written Opinion, PCT Application No. PCT/US2010/038023, Aug. 3, 2010, seven pages.
Australian Government IP Australia, Patent Examination Report No. 1, Australian Patent Application No. 2010266611, Jan. 24, 2013, four pages.
AOL, "Mr. Message (AIM/ICQ client)," Jan. 17, 2008, three pages. [Online] [Retrieved May 15, 2014]Retrieved from the Internet.
United States Office Action, U.S. Appl. No. 12/496,606, May 22, 2014, twenty-five pages.
Canadian Intellectual Property Office, Office Action, Canadian Patent Application No. 2,766,132, Feb. 16, 2015, five pages.
State Intellectual Property Office of the People's Republic of China, Third Office Action, Chinese Patent Application No. 201080035737.7, May 25, 2015, six pages.
State Intellectual Property Office of the People's Republic of China, First Office Action, Chinese Patent Application No. 201080035737.7, Feb. 24, 2014, eight pages.
Australian Government IP Australia, Patent Examination Report No. 3, Australian Patent Application No. 2010266611, Mar. 12, 2014, three pages.
Japanese Patent Office, Office Action, Japanese Patent Application No. 2012-517563, Mar. 4, 2014, seven pages.
Sekine, M., "The Book of Twitter," Mar. 1, 2009, pp. 87-95, ISBN: 978-4-8443-2516-1, Kabushikikaisha Impress, Japan [with brief summary in English].
"Twitter.Com Autocomplete, Auto URL Expansion, Auto URL Shortener, RT Button, Nested Replies, Inline Media Embed, Search Tabs, and More", Internet Archive, Jun. 2009, [Online] [Retrieved Feb. 19, 2014]Retrieved fromot he Internet.
Australian Government IP Australia, Patent Examination Report No. 4, Australian Patent Application No. 2010266611, Jun. 4, 2014, three pages.
State Intellectual Property Office of the People's Republic of China, Second Office Action, Chinese Patent Application No. 201080035737.7, Nov. 15, 2014, nineteen pages.
Stone, B., "Replies Are Now Mentions," Twitter Blog, Mar. 31, 2009, three pages. [Online] [Retrieved Nov. 20, 2014] Retrieved from the Internet.
United States Office Action, U.S. Appl. No. 12/496,606, Nov. 28, 2014, thirty-one pages.
Australian Government, IP Australia, Patent Examination Report No. 2, Patent Application No. 2010266611, Nov. 19, 2013, six pages.
Russakovskii, A., "Twitter.com Autocomplete, Auto URL Expansion, Auto URL Shortener, RT Button, Nested Replies, Inline Media Embed, Search Tabs, and More," Jun. 28, 2009, twelve pages. [Online] [Retrieved Dec. 26, 2013].
State Intellectual Property Office of the People's Republic of China, Fourth Office Action, Chinese Patent Application No. 201080035737.7, Dec. 4, 2015, six pages.
United States Office Action, U.S. Appl. No. 12/496,606, Feb. 8, 2016, thirty pages.
United States Office Action, U.S. Appl. No. 13/239,736, Nov. 27, 2015, 7 pages.
United States Office Action, U.S. Appl. No. 13/239,736, Aug. 31, 2015, 8 pages.
United States Office Action, U.S. Appl. No. 13/239,736, Oct. 8, 2013, 14 pages.
United States Office Action, U.S. Appl. No. 13/239,736, Sep. 28, 2012, 13 pages.
United States Office Action, U.S. Appl. No. 12/496,606, Sep. 6, 2011, 15 pages.
United States Office Action, U.S. Appl. No. 12/496,606, Apr. 6, 2011, 16 pages.
United States Office Action, U.S. Appl. No. 12/496,606, Sep. 22, 2016, thirty-four pages.

* cited by examiner

GATHERING INFORMATION ABOUT CONNECTIONS IN A SOCIAL NETWORKING SERVICE

CROSS REFERENCE TO RELATED APPLICATIONS

This application is a continuation of U.S. patent application Ser. No. 13/239,736, filed on Sep. 22, 2011, now U.S. Pat. No. 9,332,077, issued on May 3, 2016, which is a continuation of U.S. patent application Ser. No. 12/496,606, filed on Jul. 1, 2009, both of which are herein incorporated by reference.

BACKGROUND

The present invention relates generally to social networking services and more particularly to providing users, which may include entities such as businesses, the ability to identify information about connections, including interests and relationships, in a social networking service.

Conventionally, users of social networking services establish relationships or connections with other users. Information about these users and their relationships is often self-reported (e.g., information about the user's interests, activities, and the nature of their relationships with other users). Additional information about users and their relationships with other users also may be collected by the social networking service, such as the number, frequency, and directionality of interactions between users and the various types of interactions which may occur between users, just to name a few. Information about users, their relationships, and interests is valuable, both to users of social networking services (including advertisers who may wish to market products using certain viral marketing campaigns that utilize this information) and to administrators of the social networking service wishing to develop a more personalized experience for their users.

While existing methods of aggregating information about users and their relationships in a social networking service provide useful data, users cannot be relied upon to document the full extent of their activities, interests, and nature of their relationships with other users of the social networking service. For example, a user may have one-way or reciprocal connections with different types of users, including individuals, products, brands, celebrities, retail stores, sport teams, community events, social causes, social movements, political campaigns, charities, etc. Users may also have interests in ideas and concepts that extend in scope beyond the social network and the Internet, such as an interest in "watching fireworks" or "Family Guy." As a user becomes connected with more and more people, concepts, and entities within and outside of a social networking service over time, the user may develop stronger connections with certain people, concepts, and/or entities than with others.

Tools are needed to establish and enhance connections in an abbreviated and user-friendly manner. A user may wish to reference other people, concepts, and/or entities that exist on the social networking service and outside of the social networking service when posting content. Conventional social networking services lack a content upload and delivery mechanism that enables users to easily refer to concepts and other users when posting content for the other users to view, while also aggregating information about the users, their relationships with other users, and the concepts that interest them.

SUMMARY

To enhance and gather information about users of a social networking service, their interests and relationships within the social networking service, the Internet, and in real life, embodiments of the invention enable users of the social networking service to reference nodes in the social networking service when posting content to a communication channel. Nodes may represent users, entities, concepts, content items, groups, events, actions, and/or other objects on the social networking service and outside of the social networking service. The connections between nodes may also be described as "edges" in the social graph. In one embodiment, when posting to a communication channel, a user may select a linked representation of a node on the social graph other than the node of the posting user. By choosing to include a linked representation of a node within a posted content item, a user can associate the information in the content item to the node identified by a link. Based on the posted content item, the social networking service updates information that it maintains (i.e. information that is stored) about the connection between the node of the posting user and the node identified in the posted content item, thereby enhancing information about the relationship between the user and the identified node. "Maintaining" data means providing for the ability to access (read and/or write) data in the database. Data may be stored in a maintained database by any object having access to the database. In effect, the social networking service can map the unstructured data contained in a posted content item to the structured data of the social graph, including nodes and the established connections between the nodes.

Information about connections may be maintained in a database that is indexable and searchable. As users identify connections in content items posted to communication channels of the social networking service, the maintained information is updated in the database. As a result, data may be aggregated to discover the contours and gradients of the information about relationships on the social networking service. In one embodiment, edge information is utilized in computing a user's affinity for other nodes on the social networking service.

In one embodiment, a user interface that enables users to post content items in one or more communication channels of the social networking service also includes an interface that allows the posting user to identify relationships within the posted content item. For example, a trigger (e.g., a special character, symbol, or icon) received in the interface may indicate that a user wishes to reference a node in the posted content item. Selectable links may be provided to enable the user to author a content item comprising a link to another node in the social networking service. After sharing the content item comprising the link to another node in the social networking service, information about the connection between the posting user and the referenced node is updated.

In a further embodiment, a user may place the trigger and the link within the content item to affect the distribution of the content item via particular communication channels. If the content item begins with the trigger and the link, for example, the user posting the content item may intend the content item to be specifically delivered to the referenced node. As a result, the content item may only be distributed as a direct communication to the referenced node.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking service offers its users the ability to communicate and interact with other users of the social networking service. In use, users join the social networking service and then add connections to other users, individuals and entities, to whom they desire to be connected. As used herein, the term "friend" refers to any other user to whom a user has formed a connection, association, or relationship via the web site. The term "user" refers to individuals and entities (such as business, products, bands, causes, etc.) that may exist or be represented in a social networking environment. Connections may be added explicitly by a user, for example, the user selecting a particular other user to be a friend, or automatically created by the social networking service based on common characteristics of the users (e.g., users who are alumni of the same educational institution). Connections in social networking services are usually in both directions, but need not be. For example, if Bob and Joe are both users and connected to each other on the social networking service, Bob and Joe, both users, are also each other's friends. If, on the other hand, Bob wishes to connect to Sam to view Sam's posted content items, a one-way connection is also possible. The connection between users may be a direct connection; however, some embodiments of a social networking service allow the connection to be indirect via one or more levels of connections. Also, the term friend need not require that users actually be friends in real life, (which would generally be the case when one of the users is a business or other entity); it simply implies a connection in the social networking service.

In addition to interactions with other users, the social networking service provides users with the ability to take actions on various types of items supported by the website. These items may include groups or networks (where "networks" here refer not to physical communication networks, but rather social networks of people, entities, and concepts) to which users of the social networking service may belong, events or calendar entries in which a user might be interested, computer-based applications that a user may use via the social networking service, transactions that allow users to buy or sell items via the service, and interactions with advertisements that a user may perform on or off the social networking service. These are just a few examples of the items upon which a user may act on a social networking service, and many others are possible. Though many of the embodiments/examples provided below are directed to a social networking service, the invention described herein is not limited to a social networking service, but can include other environments involving social networking services, social content, or other types of websites.

User generated content on a social networking service enhances the user experience of the social networking service. "Content" may include any type of media content, such as status updates or other textual messages, location information, photos, videos, and links. Content may also be posted by an authorized third-party application to a user's "communication channel," such as a newsfeed or stream. Content "items" represent single pieces of content that are represented as objects in the social networking service. In this way, users of a social networking service are encouraged to communicate with each other by "posting" content items of various types of media through various communication channels. Using communication channels, users of a social networking service increase their interaction with each other and engage with the social networking service on a more frequent basis. Communication channels may comprise one or more different information delivery methods, comprising a stream, a feed, a wall post, an email communication, a comment on a posted content item, a mobile application, a note, a third-party application, a text message, a third-party website, an advertising communication channel, a discussion board, or any other communication channel that exists or is associated with the social networking service. Communication channels are discussed further in U.S. patent application Ser. No. 12/253,149, filed on Oct. 16, 2008, which hereby incorporated by reference in its entirety.

As content items are posted to various communication channels, comments, discussions, and conversations between users emerge. For example, a user may post the status update, "Going to lunch with Tom." Comments from connections who view the posted status update may ask, "Tom who?" or "Can I come?" Conventional social networking services fail to enable users to specifically identify and link a node to a posted content item. In response, a needless conversation attempting to identify the referenced "Tom" may ensue. The fact that the user mentioned "Tom" in a recent status update, a fact that may indicate a stronger connection to Tom, is also not recorded in conventional social networking services.

In one embodiment, a social networking service enables a user to identify, reference, or otherwise mention another node while posting a content item to the social networking service. "Nodes" on a social graph in a social networking service may represent objects on the social networking service, such as actual users and other entities within the social networking service that have profile information. These types of entities may post content to communication channels within the social networking service. For example, a user and the user's friends in the social networking service are included in this category of nodes. These nodes have "identities" because they represent actual users and entities with profile information. Entities such as products or brands (e.g., Coke™), celebrities, retail stores, and sports teams, may also have identities because an actual entity is identified and claimed in the social networking service. Other types of nodes, such as applications, transactions, digital content, events, groups, and concepts, may also have "identities" because those nodes may be controlled by a specific user or entity.

Nodes may also represent concepts that extend beyond the social networking service that exist on the Internet and/or in the real world, and outside of the social networking service. This category of nodes may not be able to post content to communication channels in the social networking service because no single user or entity may control the concept. For example, the concept of "surfing" is not owned or controlled by a single user or entity. Thus, a node may exist on the social networking service so that "surfing" may be referenced in a posted content item, even though "surfing" does not actually exist as an entity or a user on the social networking service. Therefore, these nodes may be described as having no "identity" on the social networking service. In one embodiment, identity-less referenced nodes may link to an external website. In another embodiment, an identity-less referenced node may link to search results for the identity-less referenced node on the social networking service.

Nodes may exist on the Internet as web pages and as concepts outside of the social networking service. For example, a node called "Cowboys" may refer to a sports team, a website about country-western apparel, or the abstract concept of actual cowboys. In one embodiment, a referenced node may provide a link to the external webpage it represents.

Connections, or edges, between nodes on a social graph comprise both the relationships and the interests of the nodes. On a social networking service, connections may be represented by objects. Thus, as used herein, information about connections are stored as the objects representing the connections. Connections, therefore, may be "enhanced" based on interactions between the connected nodes, in one embodiment, by updating the maintained information about the connections stored as an object in a database. The maintained information may, in some embodiments, be an affinity score, or a numerical value representing the strength of connection between the two nodes. As described herein, a connection or edge may be used interchangeably with an affinity score. Thus, more information about connections may be gathered by the social networking service.

Connections or edges may also be created or enhanced based on a user's interest or reference to a concept, such as "surfing," that does not actually exist as an entity or a user on the social networking service. Edges, represented by objects, may be created to represent a user's interest in such concepts. These edges may be strengthened based on how frequent a user references such concepts, in one embodiment.

Indirect connections may also be implied by the social networking service based on the user's affinities and interests and the user's connections to other nodes. For example, a user may be strongly connected to a first node that is also strongly connected to a second node. The user may not be connected to the second node on the social networking service, but it is possible that the connection does not exist because the user and the second node have "found" each other on the social networking service yet. Therefore, in one embodiment, these indirect connections may be included in the pool of a user's connections and may help "build" the user's social graph.

A "trigger," such as a special character or symbol, may be used while inputting text to indicate that the user desires to identify another node. Selectable links to nodes are then provided to the user responsive to the trigger. These selectable links may also be called candidate nodes because they comprise the nodes which the user may wish to reference. In one embodiment, the provided nodes are narrowed responsive to additional input from the user. Thus, a user may quickly and easily reference one or more nodes while posting a content item to the social networking service.

Returning to the example above, a user may now post the status update, "Going to lunch with @Tom." In this example, the '@' symbol is the trigger, while "Tom" is the node being referenced. As soon as the trigger is entered, a drop down list with selectable links to nodes connected to the user is displayed in one embodiment. In another embodiment, the drop down list with selectable links may also include nodes within the social networking service that the user is not directly connected to, but is likely to be interested in based on the user's existing connections and affinities. For example, the user may not be directly connected to Tom, but may be a friend of a friend. Or, as another example, a celebrity such as "Tom Cruise" may not be a direct connection, but may be a suggested node because of a professed interest in a movie which stars Tom Cruise.

In one embodiment, the drop down list may adaptively respond to inputted text. This means that the drop down list filters the selectable links according to the inputted text after the trigger. Said another way, the drop down list adaptively identifies candidate nodes, or objects, that correspond to corresponding selectable links. Thus, after the first letter "T" is inputted, the selectable links that appear in the drop down list will include at least the letter "T" in lowercase or uppercase. As the user inputs text, the selectable links displayed in the drop down list will contain a word that matches the string of inputted text. The string of inputted text, therefore, is an identifier of a node with a corresponding selectable link. In this way, the drop down list adaptively responds to inputted text by adaptively identifying potential nodes to be referenced.

Thus, if the user is connected to three different users named "Tom," the list will display those three nodes. However, more nodes may also be displayed, for example, if the user is connected to nodes with names matching the string of inputted text, "Tom." Thus, if the user is part of the group "Tom & Jerry is awesome," planning to attend the event "Vote for Tom Arnold in 2012!," and a fan of "The Adventures of Tom Sawyer," then those nodes may also appear in the drop down list. The user then selects the link corresponding to the desired node. In one embodiment, a link to the matching node that the user most recently interacted with appears at the top of the drop down list. In another embodiment, a link to the matching node with the highest affinity is displayed at the top of the drop down list. In yet another embodiment, the display order of the selectable links first comprises users, then entities, and concepts. Various combinations of these methods may be used.

In this example, a user posting the status update "Going to lunch with @Tom" may select a link to a user named "Tom." A graphical representation of the relationship appears after the user selects the desired link. In some embodiments, a username would appear within the graphical representation. In one embodiment, a thumbnail, profile picture, or other visual object associated with the user appears in the graphical representation. In another embodiment, only the text inputted by the user would appear in the graphical representation.

By enabling the use of the trigger to identify and reference other nodes on the social networking service, information about connections between nodes that are referenced can be gathered on a continual basis. In the example described above, several pieces of information about the user's relationship with Tom is revealed in the status update, including the time of the update, the entities involved, and the action taking place (the posting of a status update).

Figure 1:
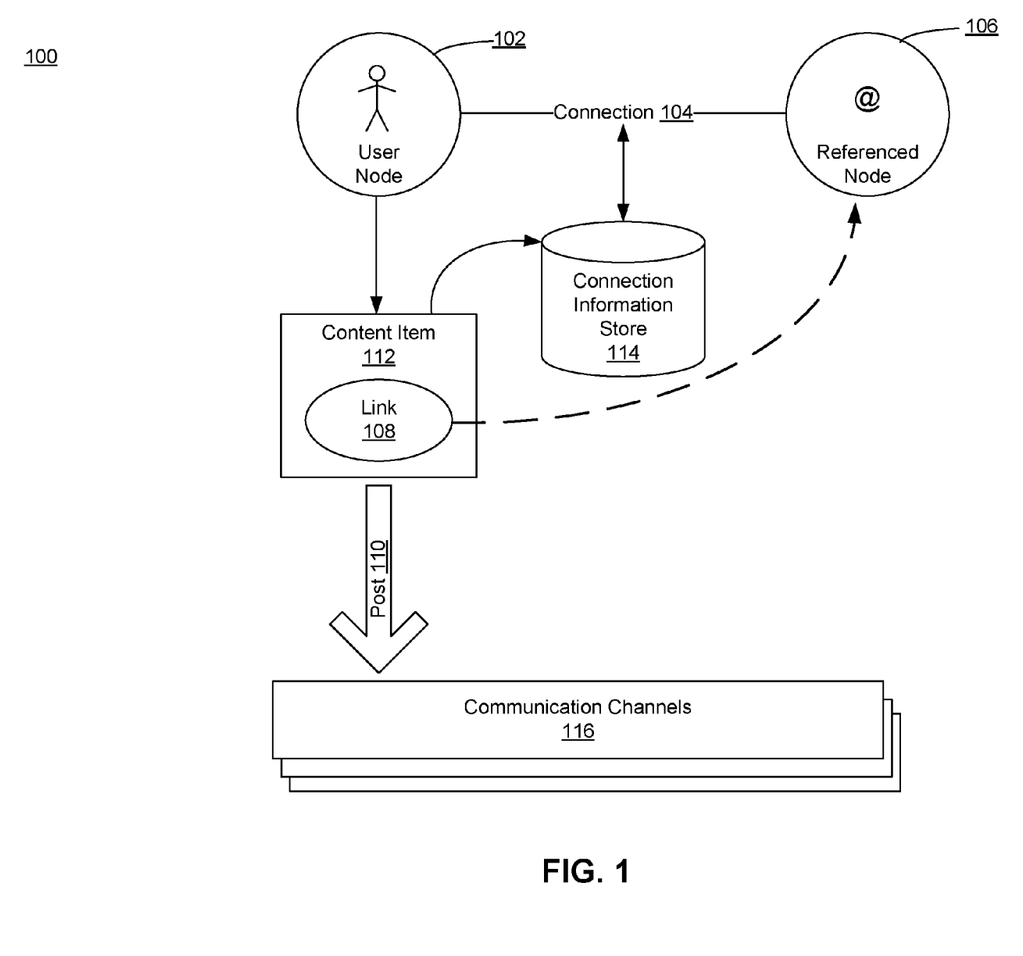
FIG. 1 is a high-level conceptual diagram illustrating how a user may provide information about a connection with a referenced node, in accordance with an embodiment of the invention.

As depicted in FIG. 1, a high-level conceptual diagram of one embodiment of the invention, a social networking service 100 may comprise a user node 102, a referenced node 106, and a connection 104 between the two nodes. In FIG. 1, the user node 102 authors a content item 112 for posting to communication channels 116. Communication channels 116 may comprise one or more different information delivery methods, comprising a stream, a feed, a wall post, an email communication, a comment on a posted content item, a mobile application, a note, a third-party application, a text message, a third-party website, an advertising communication channel, a discussion board, or any other communication channel that exists or is associated with the social networking service. An advertising communication channel may comprise, in one embodiment, the content of the advertisement. A discussion board may reside on many different types of objects, such as an event, a group, a fan page, and a photo album, just to name a few.

Content item 112 comprises a link 108 to a referenced node 106. In one embodiment, the link 108 to the referenced node 106 is triggered, or enabled, when a user inputs a special character, symbol, or icon while posting the content item 112. In this embodiment, when the user inputs the "trigger," this action indicates that the user desires to identify a node in the content item 112, the referenced node 106. Information about the connection 104 is maintained and updated in the connection information store 114. In one embodiment, the connection information store 114 is a database. After content item 112 is posted 110 to the communication channels 116, information about the connection 104 between the user node 102 and the referenced node 106 is enhanced by updating the maintained information. After information about the connection 104 has been updated in the connection information store 114, a pointer (reference) to the content item 112 is also stored in the connection information store 114.

The referenced node 106 may represent any type of node on the social networking service 100 with which users can interact and engage. In one embodiment, a pre-existing relationship with the referenced node 106 is optional. In that case, the user creates a connection 104 by mentioning the referenced node 106 within a content item 112. Thus for example, if a user was not a 'fan' of Coke, meaning that the user did not have a relationship, interaction or connection with the node representing Coke, an entity on the social networking service 100, but mentioned "Coke" in a status update, a connection with the node representing "Coke" would be automatically generated by the social networking service 100, according to one embodiment. In one embodiment, when a user refers to a node with which they have no previous relationship, interaction or connection, the user will be prompted by the social networking service to form a formal and/or express connection with that node (e.g. by becoming a "fan" of Coke).

The referenced node 106 may also receive a notification, via various communication channels, that the user mentioned the referenced node 106 in the posted content item 112. Thus, the referenced "Tom" in the previous example, in which the user posted the status update "Going to lunch with @Tom" may receive, in one embodiment, a notification such as "Blake mention you in his status." Notifications about actions taken by users greatly enhance the interaction that occurs between users, thus further enhancing information about the connections on the social networking service.

System Architecture

Figure 2:
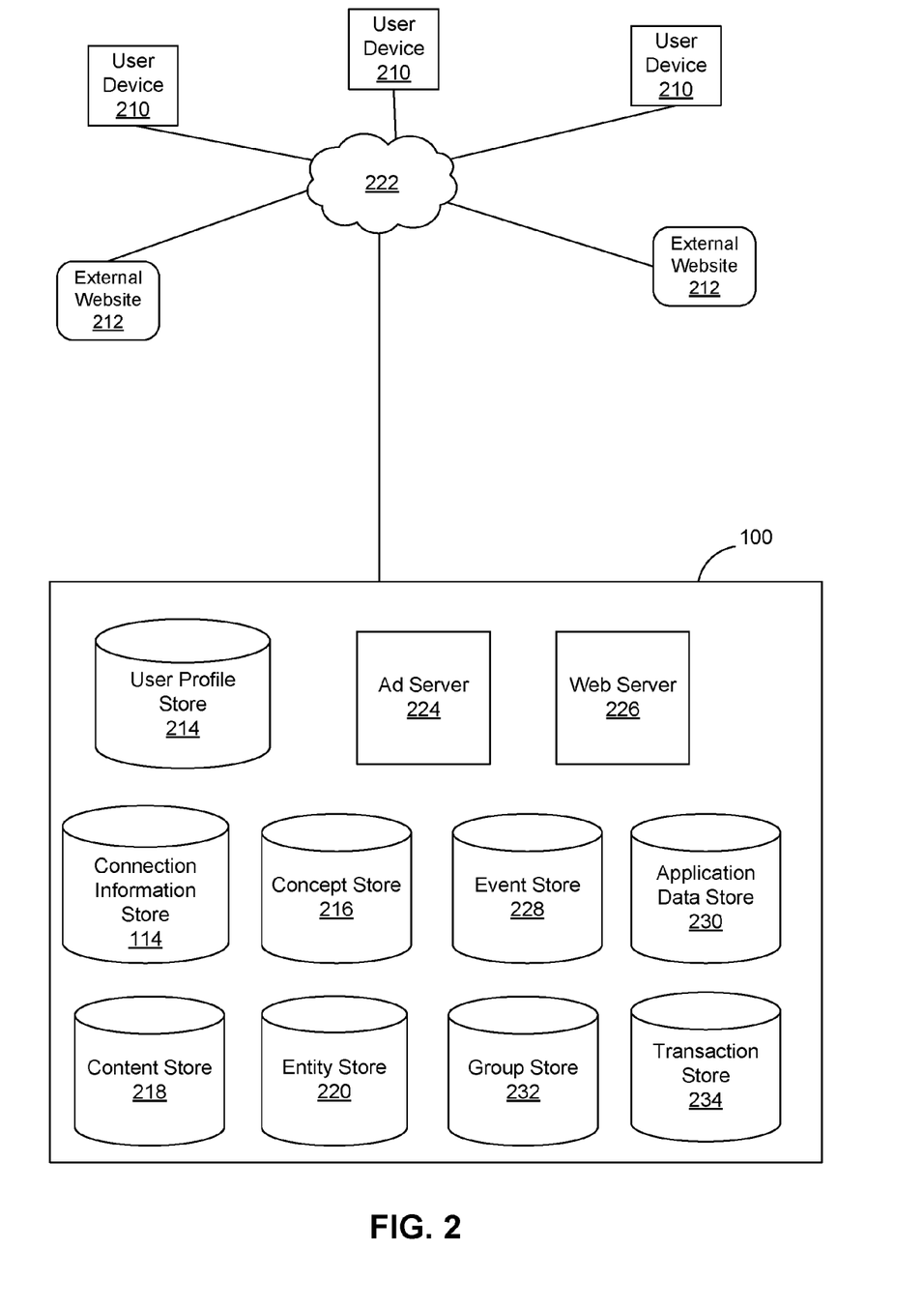
FIG. 2 is a network diagram of a system for enhancing information about connections between nodes on a social networking service, showing a block diagram of the social networking service, in accordance with an embodiment of the invention.

FIG. 2 is a high level block diagram illustrating a system environment suitable for operation of a social networking service 100. The system environment comprises one or more user devices 210, one or more external websites 212, a social networking service 100, and a network 222. In alternative configurations, different and/or additional modules can be included in the system.

The user devices 210 comprise one or more computing devices that can receive user input and can transmit and receive data via the network 222. For example, the user devices 210 may be desktop computers, laptop computers, smart phones, personal digital assistants (PDAs), or any other device including computing functionality and data communication capabilities. The user devices 210 are configured to communicate via network 222, which may comprise any combination of local area and/or wide area networks, using both wired and wireless communication systems.

FIG. 2 also illustrates a block diagram of the social networking service 100. The social networking service 100 includes a web server 226, an ad server 224, a user profile store 214, a connection information store 114, an entity store 220, an application data store 230, a transaction store 234, a content store 218, an event store 228, a group store 232, and a concept store 236. In other embodiments, the social networking service 100 may include additional, fewer, or different modules for various applications. Conventional components such as network interfaces, security mechanisms, load balancers, failover servers, management and network operations consoles, and the like are not shown so as to not obscure the details of the system.

The social networking service 100 comprises a computing system that allows users to communicate or otherwise interact with each other and access content as described herein. The social networking service 100 stores user profiles that describe the users of a social networking service, including biographic, demographic, and other types of descriptive information, such as work experience, educational history, hobbies or preferences, location, and the like. The social networking service 100 further stores data describing one or more connections between different users in the connection information store 114. This connection information identifies users who have similar or common work experiences, group memberships, hobbies, or educational histories. Additionally, the social networking service 100 includes user-defined connections between different users, allowing users to specify their relationships with other users. For example, these user defined connections allows users to generate relationships with other users that parallel the users' real-life relationships, such as friends, co-workers, partners, and so forth. Users may select from predefined types of relationships, or define their own relationship types as needed.

A user (or other type of node) may have a particular affinity, which may be represented by an affinity score, for another node on a social networking service. In this context, an affinity score indicates the strength of correlation or interest between a user and another node in the social networking service. Affinity scores for a user's connections are stored in the user profile object for that user in the user profile store 214. Information about connections stored in the connection information store 114 may be used in computing the affinity score between users, or nodes, of the social networking service. In one embodiment, this connection information comprises an affinity score. As indicated above, a node may be a user, entity, concept, or any other object with which a user may engage and interact on a social networking service. Methods for determining affinities between users of a social networking service are described further in U.S. application Ser. No. 11/503,093, filed Aug. 11, 2006, entitled "Displaying Content Based on Measured User Affinity in a Social Network Environment," hereby incorporated by reference in its entirety.

In addition to basic information regarding the connection, the connection information store 114 stores other information about the connection. As described in FIG. 1, a user posting a content item with a link that references another node in the social networking service 100 adds more information about the connection—that the user is currently interested in the referenced node. Unlike a former co-worker that a user barely interacts with, the connection with the referenced node is stronger because it was recently and explicitly mentioned by the user. Other actions on the social networking service 100 may increase the information about a user's connection with a node, such as recently viewing the profile of the node and recently interacting with objects posted by the node, such as the node's posted events, photos, status updates, etc. In one embodiment, this connection information comprises an affinity score as described above. Additionally, because the information about the connection is stored as an object within the connection information store 114, the connection information is indexable and can be searched in real-time.

Because connection information is indexable and searchable, other applications and third-party applications, in one embodiment, may utilize the connection information to gauge connections on the social networking service in real-time. This type of information is valuable to all users of the social networking service 100, particularly advertisers, who wish to get a pulse on what concepts and entities are currently being discussed on the social networking service 100. In one embodiment, a user may customize the search of the connection information store 114 to refine search results, such as targeting specific types of connections, specifying a timeframe to search connection information, and adding keywords in addition to the connection information.

The information about connections between nodes on the social networking service 100 is constantly in flux. As users interact with each other and objects posted by other users of the social networking service 100, information about connections with the other users is enhanced. Similarly, as users interact with other nodes on the social networking service 100, those interactions enhance the information about the connections with those nodes.

Because information may be time-sensitive, some information about connections stored in the connection information store 114 will decrease in value as a function of a time-based decay factor, in one embodiment. A time-based decay factor may comprise a numerical factor that, while weighting the updated information stored in the connection information store 114, decreases over time. In one embodiment, the time-based decay factor reduces to zero after a specified time period. As a result, some of the updated information may only "enhance" the information about a connection over a short period of time. A social networking service may selectively determine what information is time-sensitive and what information is not.

In one embodiment, information about a connection between a user and a node in the social networking service may not exist in the connection information store 114. For example, users can become fans of entities on the social networking service, such as Coke. Becoming a fan of an entity creates a connection between the user and the entity. In one embodiment, if a user posts a content item mentioning "Coke," a connection is created between the user and the node representing the entity "Coke." This means that an object in the connection information store 114 is generated to describe information about the newly-formed connection between the user and the node representing the entity "Coke." A user may utilize this technique to generate a connection with any type of node in the social networking service 100, such as an event, a content item, a group, a user, application, etc., in one embodiment. As a result, the structure of the connection information store 114 enables users to build out the social graph simply by mentioning the concept in a posted content item, in one embodiment.

The social networking service 100 maintains data in a database about a number of different types of objects with which a user may interact on the social networking service 100, including concepts, content items, entities, events, applications, groups, and transactions. To this end, each of the user profile store 214, the connection information store 114, the concept store 216, the content store 218, the entity store 220, the event store 228, the application data store 230, the group store 232, and the transaction store 234 stores a data structure in a database to manage the data for each instance of the corresponding type of object maintained by the website 100. The data structures comprise information fields that are suitable for the corresponding type of object. (For example, the event store 228 contains data structures that include the time and location for an event, whereas the user profile store 214 contains data structures with fields suitable for describing a user's profile.) When a new object of a particular type is created, the website 100 initializes a new data structure of the corresponding type, assigns a unique object identifier to it, and begins to add data to the object as needed. This might occur, for example, when a user uploads a new content item, wherein the social networking service 100 would generate a new instance of a content item in the content store 218, assign a unique identifier to the event, and begin to populate the fields of the event with information provided by the user and, subsequently as the content item is posted, by users interacting with the content item.

An ad server 224 generates and delivers advertisements to user devices 210. In one embodiment, an ad server 224 may access the connection information store 114 to take advantage of the information about connections between nodes on the social networking service 100. An analysis of the connection information may help advertisers develop better marketing campaigns through more selective targeting techniques utilizing the connection information. Targeting advertisements are further described in a related application, U.S. application Ser. No. 12/195,321, filed Aug. 20, 2008, entitled "Targeting Advertisements in a Social Network Environment," hereby incorporated by reference in its entirety.

The web server 226 links the social networking service 100 via the network 222 to one or more user devices 210; the web server 226 serves web pages, as well as other web-related content, such as Java, Flash, XML, and so forth. The web server 226 may include a mail server or other messaging functionality for receiving and routing messages between the social networking service 100 and the user devices 210. The messages can be instant messages, queued messages (e.g., email), text and SMS messages, or any other suitable messaging technique. In another embodiment, the social networking service is implemented on an application running on a user device 210 that accesses information from the social networking service using APIs or other communication mechanisms.

Figure 3:
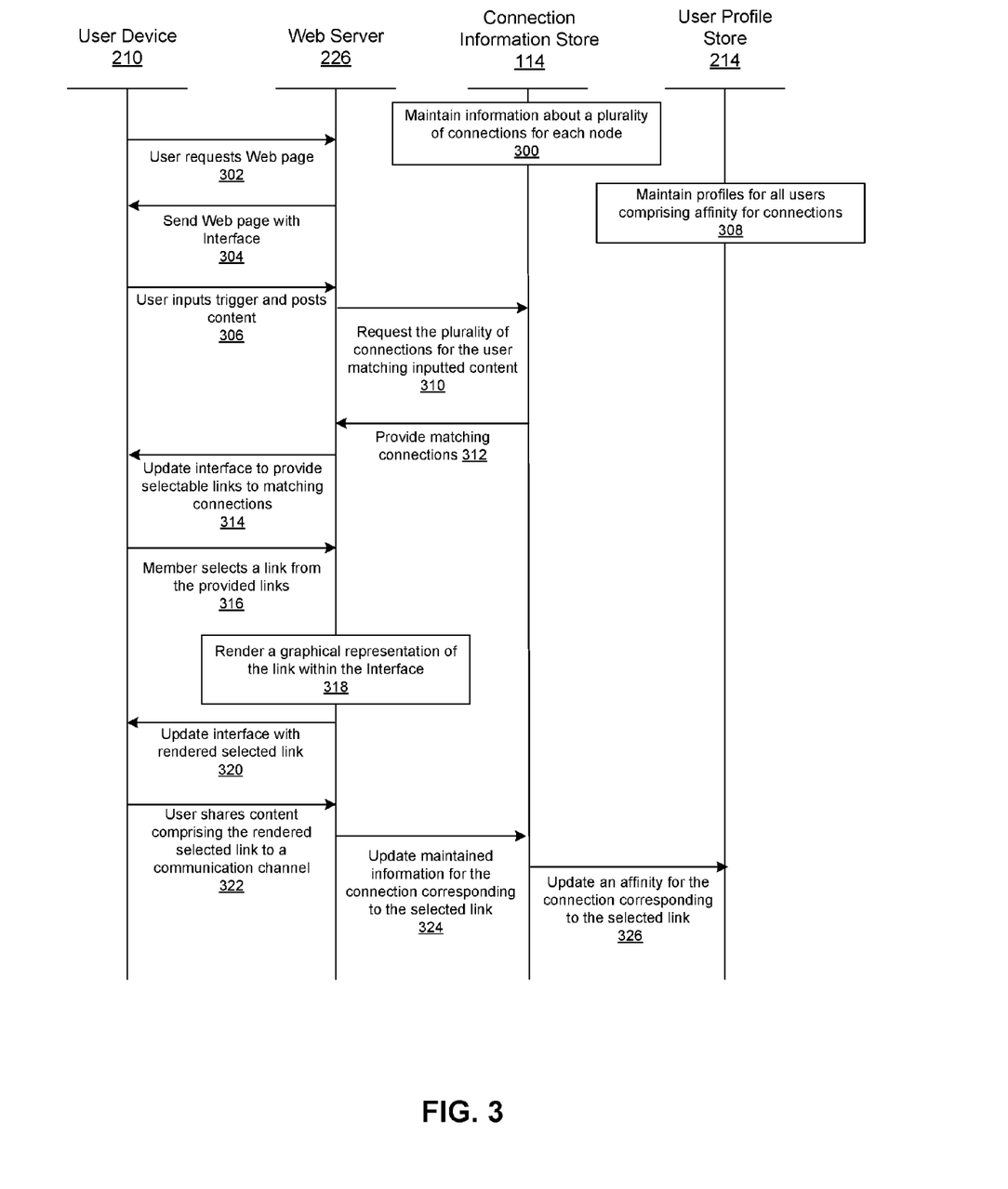
FIG. 3 is an interaction diagram of a process for enhancing information about a connection between nodes on a social networking service, in accordance with an embodiment of the invention.

Enhancing Information about Connections between Nodes on a Social Networking Service In FIG. 3, an interaction diagram shows the data flow within the system architecture, in one embodiment. A connection information store 114 maintains 300 information about a plurality of connections for each node. As mentioned above, the user profile store 214 maintains 308 profiles for users, the profiles associated with affinities for connections.

A user device 210 requests 302 a web page from a web server 226. The web server 226 sends 304 a web page with an interface in which the user can upload content. The interface may comprise any content upload mechanism on a social networking service, such as a text field for inputting a status update, a text field for commenting on a posted content item, a caption for a digital media content item, a communication channel for posting an external link to a stream, an advertisement to be posted to a communication channel, discussion board posts in groups and events, a comment box operating on an external website that is linked to a posted item in a communication channel, etc. Further, in one embodiment, the interface is a visual interface that receives any type of user input from the user device 210. In another embodiment, a user device 210 may request and receive data using an API, such as in a mobile device.

The user device 210 then inputs 306 a trigger and posts content. In one embodiment, the input is the ASCII character '@' (as illustrated in FIGS. 5A-E). The trigger may be inputted at any time while a user is posting content. For example, inputting "@Andy is cool" and "Going to lunch with @Tom" as a status update will constitute inputting a trigger, regardless of the location of the '@' symbol. Other triggers may be implemented, including audio, visual, and tactile triggers, as input into the interface.

The web server 226 then requests 310 the plurality of connections for the user matching the inputted content from the connection information store 114. In one embodiment, the request is performed as the user inputs text after the trigger. The connection information store 114 provides 312 matching connections to the web server 226. These connections comprise the user's connections in the social networking service 100 that match the inputted content after the trigger. The inputted content may match any part of the connections' names, in one embodiment. In another embodiment, the inputted content may match any keyword associated with the connections. A user may also reference a node with which they have no prior connection.

In one embodiment, if nothing is inputted after the trigger, the connection information store 114 selects connections randomly. In another embodiment, if nothing is inputted after the trigger, the connection information store 114 selects the last recently selected connections as matching connections. In a further embodiment, the full text of the content inputted immediately following the trigger is matched to the information about the user's connections maintained in the connection information store 114. If there is no match in the user's connections, a search of all nodes existing on the social networking service is performed. In one embodiment, a node is generated where there is no match for the full text of the content inputted immediately following the trigger. In another embodiment, the user may enter a link to a newly-generated node.

The web server 226 then updates 314 the interface to provide selectable links to matching connections. Updating 314 the interface comprises rendering, in one embodiment, a drop down menu comprising selectable links representing the matching connections. Matching connections are selectable links to referenced nodes in the social networking service 100. A matching connection describes the relationship with the user and another node in the social networking service 100. A link to the matching connection may, in one embodiment, be a hyperlink to the web page of, or associated with, the referenced node. Returning to a previous example, the inputted content "@Andy" would render a drop down menu with selectable links representing other nodes that the user is connected to on the social networking service. In one embodiment, the matching connections rendered in the drop down menu are a subset of all the matching connections found.

A user device 210 may then select 316 a link from the provided links. Receiving the selection of the link, the web server 226 renders 318 a graphical representation of the link within the interface. The web server then updates 320 the interface with the rendered graphical representation of the link. In one embodiment, the rendered graphical representation of the selected link comprises a non-editable atomic icon labeled with text corresponding to the trigger and the inputted content following the trigger. In the previous example, "@Andy" would appear on the rendered graphical representation of the link. In another embodiment, the rendered graphical representation of the selected link comprises a photo of the referenced node. In one embodiment, the rendered graphical representation of the selected link may comprise the full name, or username, of the referenced node. In yet another embodiment, a shortened name, or shorthand description of the referenced node, may be implemented.

After the graphical representation of the selected link is rendered within the interface, the user may continue to upload content. The user then shares 322 the content item comprising the rendered selected link to a communication channel. In the embodiment depicted in FIG. 3, a web server 226 receives the posted content item from the user device 210, yet in other embodiments, an API may send and receive data, including posted content, from the social networking service 100. In FIG. 3, the web server 226 then updates 324 the maintained information about the connection corresponding to the selected link in the connection information store 114. The updated information in the connection information store 114 is available in real-time, in one embodiment.

The affinity for the particular connection referenced by the user associated with the user's profile stored in the user profile store 214 is then updated 326 by the connection information store 114. In one embodiment, this updating occurs in real-time, yet in other embodiments, the update occurs periodically. Updating the affinity with the information about the connection stored in the connection information store 114 enables the social networking service to provide contouring to the connection between the user and the referenced node, even if the strength of the connection is lop-sided. For example, a user may be a die-hard fan of Michael Jackson, mentioning "@MJ" regularly in posted content items. Michael Jackson, on the other hand, may not have the same strength of connection, even though a connection with the user exists. Thus, the contours of the social graph of a particular node may be discovered using embodiments of the invention described herein.

Figure 4:
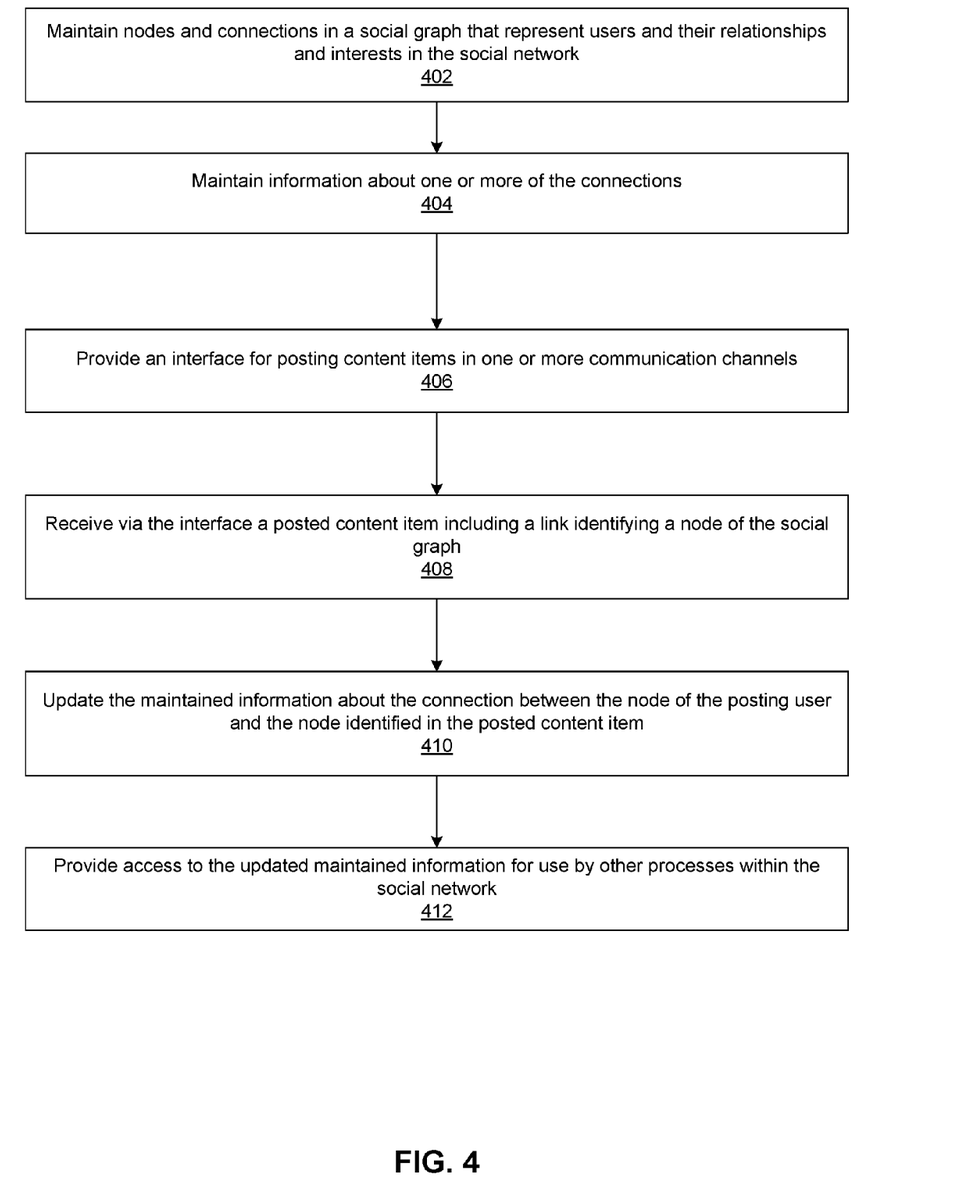
FIG. 4 is a flowchart depicting a process for enhancing information about a connection between nodes on a social networking service, in accordance with an embodiment of the invention.

Providing Access to Enhanced Information about Connections in a Social Networking Service FIG. 4 depicts a flowchart illustrating how access to enhanced information about connections in a social networking service is provided. Particular steps in the flowchart may, in other embodiments, be repeated and/or performed out of order. In one embodiment, nodes and connections between the nodes in a social graph that represent users and connections in the social networking service are maintained 402. Information about one or more of the connections is also maintained 404. An interface is provided 406 for posting content items in one or more communication channels. A posted content item including a link identifying a node of the social graph is received 408 via the interface. The maintained information about the connection between the node of the posting user and the node identified in the posted content item is then updated 410. Finally, access to the updated maintained information is provided 412 for use by other processes within the social networking service. In some embodiments, processes and applications connected to but outside the social networking service may also access the maintained information.

Figure 5A:
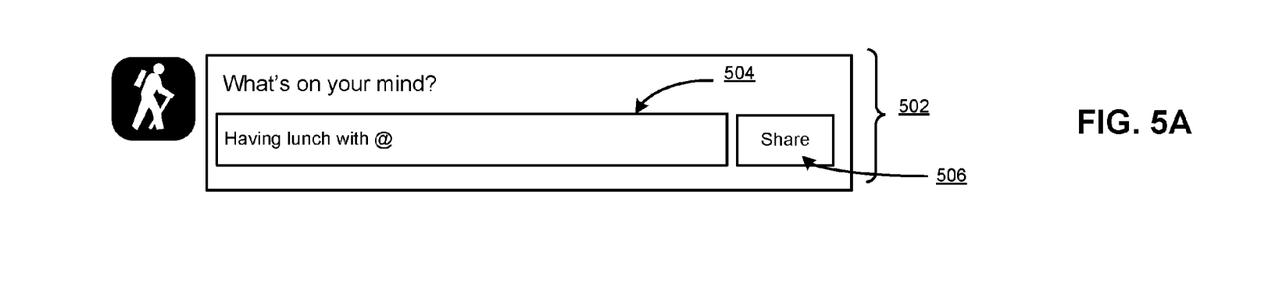
FIGS. 5A-E are screenshots depicting progressive phases of an interface for enhancing information about connections between nodes on a social networking service, in accordance with an embodiment of the invention.
Figure 5B:
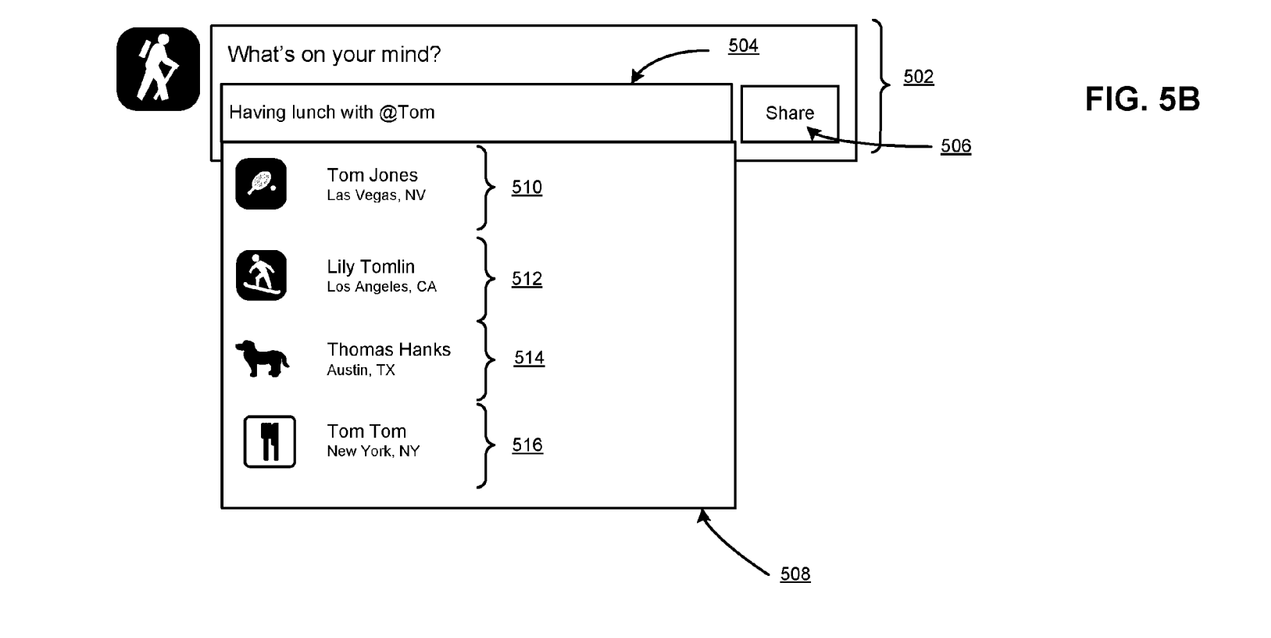

FIGS. 5A-E illustrate screenshots of an interface in which a user may reference another node in the social networking service in one embodiment. In particular, FIGS. 5A-E are screenshots depicting progressive phases of the interface for enhancing information about connections between nodes on a social networking service, in accordance with an embodiment of the invention. As shown in FIGS. 5A-E, an interface 502 comprises an input field 504 in which content may be entered. Button 506 enables the user to post the content item. FIG. 5B illustrates a drop down list 508 that appears after text is inputted after the trigger, in this case the '@' symbol.

FIG. 5B also illustrates various matching connections 510, 512, 514, and 516 that appear in the drop down list 508. Each of the matching connections 510, 512, 514, and 516 are a selectable link to the referenced node. Note that the text "Tom" after the trigger in the input field 504 is matched to the matching connections 510, 512, 514, and 516. In one embodiment, matching connection 514 is displayed because "Tom" is mapped, or associated, with the referenced node "Thomas Hanks," making it a matching connection 514.

Figure 5C:
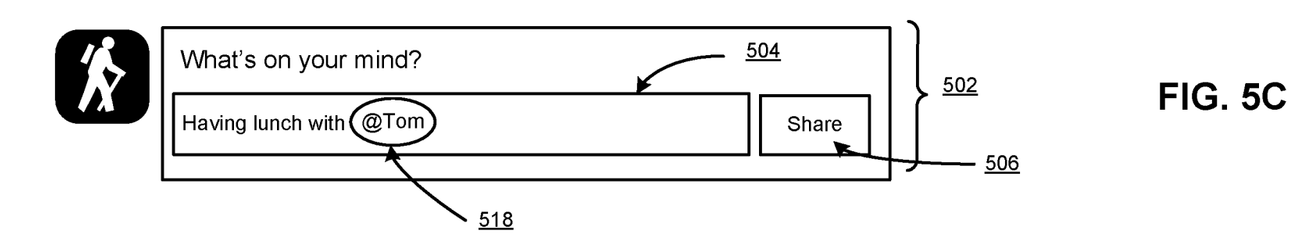
Figure 5D:
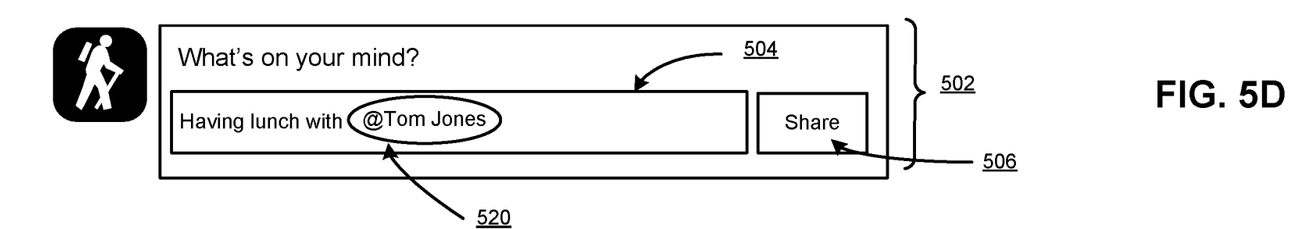

FIG. 5C illustrates one embodiment of the interface 502 in which a shortened description is used in the referenced node 518. In FIG. 5C, the referenced node 518 is labeled "@Tom" and is represented by a non-editable atomic icon, as described above. In FIG. 5D, another embodiment of the interface 502 illustrates the full name of the selected referenced node 520, "Tom Jones." The referenced nodes 518 and 520 may be deleted by the user, but the text within the atomic icon may not be edited.

Figure 5E:
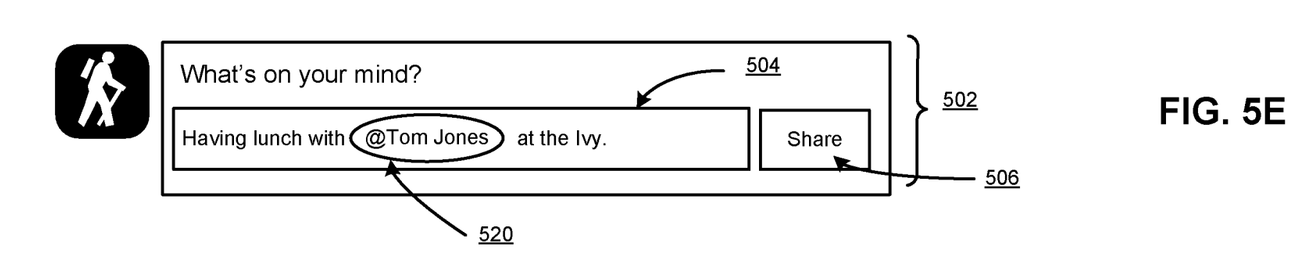

FIG. 5E illustrates that more content may be inputted in the input field 504 after the referenced node 520. Thus, the status update "Having lunch with @Tom Jones at the Ivy." may read as a full sentence once the user decides to post the status update by selecting the "Share" button 506. Once posted, the content item will be distributed via the various communication channels of the social networking service, and the maintained information about the connection between the user and "Tom Jones" will be enhanced as described above.

The input method described in one embodiment above, involving inputting a trigger with content, may be implemented as a user interface in multiple contexts, such as a text field in a web browser, a mobile API, and external websites in communication with the social networking service. To make this user interface extend to multiple contexts, a feature of web browsers called "contentEditable" may be employed. This attribute can be given to any HTML Element and will allow the contents of that element to be modified by users, as if it were a normal text area. This functionality provides additional benefits, such as including markup in the box in which the user is typing. This functionality, in addition to JavaScript functionality, may be used to display the non-editable atomic icons of the referenced nodes 518 and 520 after they are inserted, as illustrated in FIGS. 5C-E. These icons may be removed completely, of course, by the user from within the user interface.

The "active query" in which the user inputs text and adaptively receives results for connections may be implemented using two separate JavaScript APIs. One API is the Range API available in Mozilla and Webkit based browsers, and the other is the TextRange API provided by Internet Explorer. Using browser-provided methods, the interface determines what text the user is typing in order to filter the user's connections. When the user finds a matching connection, they are able to select it, thus inserting the referenced node into the contentEditable "box." Before posting the content item to the server, the content is structured such that a server side script can parse out the information needed to distribute the posted content item via particular communication channels and enhance the maintained information about the connections, as described above.

Access to information about connections on the social networking service enables the social networking service to encourage more interaction on the social networking service. Various mechanisms and processes may utilize the information stored in the connection information store 114. For example, a content item may be produced by the social networking service and posted to one or more communication channels to indicate that a user referenced another node in the social networking service, such as "Blake mentioned Tom in his status update." In one embodiment, a node (user, entity, or concept) may be notified, via various communication channels, that he or she was mentioned by another node. In one embodiment, the adjustment to connection information is determined by analyzing the content item for negative or positive connotations. For example, a photo caption that reads "I hate @Working" might negatively impact the information about the connection with the referenced node, Working (e.g., where an node has been established in the social networking service for the concept of "Working").

As mentioned above, a user may post a content item from an external website and also reference another node in the content item. For example, a comment box operating on an external website may be linked to a communication channel to enable the user to share a news story, in one embodiment. The user posting the news story may reference a concept such as "working," represented as a node on the social networking service, using the method described above. In another embodiment, an external website may comprise a comment box that is linked to a content item that is already posted, but enables users of the social networking service to post additional comments on the content item. In this case, the user posting additional comments may also reference nodes on the social network. In one embodiment, a user may communicate the posted content item with another node on the social networking service from the comment box on the external website by placing the trigger and link at the beginning of the content. The referenced node may then receive the posted content item as a direct communication, as described above.

In some embodiments, the placement of the trigger and link in the content item may affect the distribution of the content item through particular communication channels. In one embodiment, if the content item begins with the trigger and the link, the user posting the content item may be directing the content item specifically to the referenced node. As a result, the content item may only be distributed as a wall post on the referenced node's wall, for example. In other embodiments, direct distributions of the content item may result in an e-mail in the referenced node's inbox, as a message in a chat box, a notification in a web browser, or even a SMS message on a mobile device.

If the content item comprises a trigger and the link within the body of the content item, then the content item's message is more about the referenced node and not intended as a direct message to the referenced node, in one embodiment. Thus, a direct communication may not be appropriate in some embodiments, leaving the content item to be distributed using normal communication channels. However, in one embodiment, a node may be configured to receive a communication each time that it is referenced by another node.

In some embodiments, the phrasing of the story produced by the social networking service and published via a communication channel may fluctuate according to the placement of the trigger and link within the posted content item. As an example, a stream, one of many communication channels on a social networking service, may report a posted content item comprising a referenced node to other nodes in the social networking service as an action, such as "Bob mentioned @Tom in a photo." This type of reporting may only occur based on the placement of the trigger and link within the posted content item, as described above, or based on the settings of the referenced node. In another embodiment, an advertisement published via a communication channel may also implement these distribution schemes based on the placement of the trigger and link within the ad.

Advertisers may also take advantage of the data stored in the connection information store 114. For example, a retail clothing advertiser may wish to market a specific line of clothing to users who have a strong interest in the San Francisco Giants. Instead of using conventional targeting criteria, such as location, demographics, and whether the users have expressed an interest in baseball, the advertiser may instead query the connection information store 114 for connections with a San Francisco Giants fan page, other fan pages for specific baseball players playing for the San Francisco Giants, as well as real-time queries for users who have recently attended a Giants game. Because the problem of multiple nodes describing the same entity (e.g. SF Giants, San Francisco Giants, and The Giants may all refer to the same sports team entity) is solved by the method described above, advertisers may confidently utilize the connection information store 114 in its targeting criteria.

In addition, advertisers may pay a premium or participate in an auction to be placed at the top of the search results for the matching connections after the trigger is inputted by a user as described above. For example, a user may enter a status update with "Go @Giants!" An advertiser of Giants clothing and merchandise may pay a premium or participate in an auction to have a link to their fan page appear higher in the matching connections search results. In this way, advertisers may pay to be "mentioned" more by particular audiences based on demographics and other targeting criteria.

The benefits of these embodiments of the invention are numerous because connections between nodes on a social networking service are provided with structure so that content may be mapped onto the structure. Instead of extracting structure from content after it has been uploaded, users may directly access and influence connection information at any time while uploading content to the social networking service in real-time.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining in a database information about a plurality of users of a communication system;
   maintaining in a database a plurality of connections between two or more of the users;
   receiving a content item from a first user of the communication system, the content item containing text input, the text input comprising a reference to a second user of the communication system;
   detecting the reference to the second user of the communication system in the content item; and
   responsive to detecting the reference to the second user, automatically selecting, by the system, a third user of the communication system to receive the content item based at least in part on whether the third user is connected to the second user in the communication system.

2. The method of claim 1, comprising:
   sending a feed for display to the third user, the feed comprising a story about the content item including the text input and the reference to the second user.

3. The method of claim 2, further comprising sending the feed for display to the second user.

4. The method of claim 2, wherein the feed further comprises an indication that the first user mentioned the second user in the content item.

5. The method of claim 1, further comprising sending a notification to the second user, the notification indicating that the second user has been referenced by the first user in a content item.

6. The method of claim 1, wherein the feed further comprises a selectable link to a page associated with the second user.

7. The method of claim 1, wherein the feed further comprises a photo of the second user.

8. A computer-implemented method comprising:
   maintaining in a database information about a plurality of users a communication system;
   maintaining in a database a plurality of connections between two or more of the users;
   providing an interface allowing the users to post content items to the communication system;
   receiving via the posting interface a plurality of posted content items from a plurality of posting users of the communication system, wherein one or more of the posted content items contain a text input comprising a reference to one or more users other than the posting users;
   detecting, in one or more of the posted content items, the reference to one or more users other than the posting users;
   responsive to detecting the reference to the second user, for a viewing user of the plurality of users of the communication system, automatically selecting, by the communication system, one or more of the posted content items based at least in part on whether the posted content item contains a text input comprising a reference to a second user with whom the viewing user has established a connection in the communication system; and
   sending a feed for display to the viewing user, the feed comprising a story about the posted content item including the text input and the reference to the second user.

9. A computer-implemented method comprising:
   maintaining in a database information about a plurality of users of a communication system;
   maintaining in a database a plurality of connections between two or more of the users;
   receiving a content item from a first user of the communication system, the content item containing text input, the text input comprising a reference to a second user of the communication system;
   detecting the reference to the second user of the communication system in the content item; and
   responsive to detecting the reference to the second user, automatically selecting, by the communication system, a third user of the communication system to receive the content item based at least in part on a connection between the third user and the second user.

10. The method of claim 9, further comprising:
    sending a story via a communication channel of communication system to the third user, the story comprising the content item including the text input and the reference to the second user.

11. The method of claim 9, wherein the communication channel comprises a stream.

12. The method of claim 9, wherein the communication channel comprises a wall post.

13. The method of claim 9, wherein the communication channel comprises a mobile application.

14. The method of claim 9, wherein the communication channel comprises a notification.

15. The method of claim 9, wherein the communication channel comprises a mobile SMS message.

16. The method of claim 9, wherein the communication channel comprises a third-party website.

17. The method of claim 9, wherein the communication channel comprises an advertising communication channel.

* * * * *

UNITED STATES PATENT AND TRADEMARK OFFICE
CERTIFICATE OF CORRECTION

PATENT NO. : 9,723,102 B2
APPLICATION NO. : 15/079490
DATED : August 1, 2017
INVENTOR(S) : Thomas Occhino et al.

It is certified that error appears in the above-identified patent and that said Letters Patent is hereby corrected as shown below:

In the Claims

Column 17, Line 32, after "The method of" delete "claim 1" and insert -- claim 2 --.
Column 17, Line 35, after "The method of" delete "claim 1" and insert -- claims 2 --.
Column 17, Line 39, after "users" insert -- of --.
Column 18, Line 1, after "reference to" delete "the second user" and insert -- a second user of the one or more users --.
Column 18, Line 6, after "comprising" delete "a" and insert -- the --.
Column 18, Line 36, after "The method of" delete "claim 9" and insert -- claim 10 --.
Column 18, Line 38, after "The method of" delete "claim 9" and insert -- claim 10 --.
Column 18, Line 41, after "The method of" delete "claim 9" and insert -- claim 10 --.
Column 18, Line 43, after "The method of" delete "claim 9" and insert -- claim 10 --.
Column 18, Line 45, after "The method of" delete "claim 9" and insert -- claim 10 --.
Column 18, Line 47, after "The method of" delete "claim 9" and insert -- claim 10 --.
Column 18, Line 50, after "The method of" delete "claim 9" and insert -- claim 10 --.

Signed and Sealed this
Twenty-sixth Day of February, 2019

Andrei Iancu
*Director of the United States Patent and Trademark Office*